United States Patent
Noda et al.

(10) Patent No.: US 7,923,105 B2
(45) Date of Patent: Apr. 12, 2011

(54) HYDROGEN SEPARATOR AND PROCESS FOR PRODUCTION THEREOF

(75) Inventors: Ken-ichi Noda, Nagoya (JP); Osamu Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 822 days.

(21) Appl. No.: 11/284,318

(22) Filed: Nov. 21, 2005

(65) Prior Publication Data

US 2006/0115643 A1 Jun. 1, 2006

(30) Foreign Application Priority Data

Dec. 1, 2004 (JP) ................................. 2004-348780

(51) Int. Cl.
*B32B 3/26* (2006.01)
*B01D 53/22* (2006.01)

(52) U.S. Cl. ............... 428/319.1; 428/312.2; 428/312.8; 428/315.5; 428/315.7; 96/11; 95/55; 95/56

(58) Field of Classification Search ............... 428/319.1, 428/312.2, 312.8, 315.5, 315.7; 96/11; 95/45, 95/55, 56
See application file for complete search history.

(56) References Cited

U.S. PATENT DOCUMENTS

| | | | |
|---|---|---|---|
| 5,518,530 A * | 5/1996 | Sakai et al. | 96/11 |
| 5,645,626 A | 7/1997 | Edlund et al. | |
| 6,761,755 B2 * | 7/2004 | Jantsch et al. | 96/11 |
| 6,958,087 B2 * | 10/2005 | Suzuki | 96/10 |
| 2003/0213365 A1 | 11/2003 | Jantsch et al. | |
| 2004/0129135 A1 | 7/2004 | Roark et al. | |

FOREIGN PATENT DOCUMENTS

| | | |
|---|---|---|
| JP | 62-047106 A1 | 2/1987 |
| JP | 62-273030 | 11/1987 |
| JP | 03-146122 | 6/1991 |
| JP | 06-277472 | 10/1994 |
| JP | 10-028850 A1 | 2/1998 |
| JP | 2001-137673 A1 | 5/2001 |
| JP | 2001-170460 A1 | 6/2001 |
| JP | 2001-286742 A1 | 10/2001 |
| JP | 2003-164740 | 6/2003 |
| JP | 2004-113950 | 4/2004 |
| WO | WO 02092203 A1 * | 11/2002 |

OTHER PUBLICATIONS

Translation of WO 02092203, Hoerpel et al, Nov. 21, 2002.*
Shu, J. et al., "Structurally stable composite Pd-Ag alloy membranes: Introduction of a diffusion barrier", Thin Solid Films, Elsevier-Sequoia S.A. Lausanne, CH, vol. 286, No. 1, Sep. 30, 1996, pp. 72-79.

* cited by examiner

*Primary Examiner* — Hai Vo
(74) *Attorney, Agent, or Firm* — Burr & Brown

(57) ABSTRACT

A hydrogen separator comprising a porous substrate composed mainly of a ceramic having a large number of pores connecting from one surface of the substrate to other surface, and a hydrogen-separating layer made of a hydrogen permselective metal formed on the porous substrate via an intermediate layer made of an electron-conductive ceramic. The hydrogen separator hardly generates defects such as peeling, cracks or the like in the hydrogen-separating layer and is suitable for use even when the hydrogen separator is exposed to a heat cycle, used under high temperature conditions or/and used for long-term.

13 Claims, 1 Drawing Sheet

HYDROGEN SEPARATOR AND PROCESS FOR PRODUCTION THEREOF

BACKGROUND OF THE INVENTION AND RELATED ART STATEMENT

The present invention relates to a hydrogen separator. More particularly, the present invention relates to a hydrogen separator which is suitable for use under high temperature conditions or/and for long-term use, as well as to a process for producing such a hydrogen separator.

A hydrogen separator comprising a porous ceramic substrate and a hydrogen-separating layer, such as palladium or palladium alloy, formed on the substrate has been used in order to separate only hydrogen selectively from a hydrogen-containing gas, such as steam-reformed gas. Such a hydrogen separator is used for hydrogen separation at high-temperatures in some cases. Therefore, the hydrogen separator is required to have high gas tightness at high temperatures or during heat cycle in which temperature increase and decrease are repeated.

Conventional hydrogen separators have, as shown in FIG. 2, a structure comprising a porous substrate 12 and a hydrogen-separating layer 13 formed on one surface 15 of the porous substrate 12. Incidentally, the porous substrate 12 has a large number of pores connecting from one surface 15 of the substrate to other surface (not shown), and is constituted by a material such as ceramic or metal. In producing a hydrogen separator 11 having a structure such as shown in FIG. 2, for example, there can be mentioned a method of plating palladium (which becomes a hydrogen-separating layer 13) on one surface 15 of a porous substrate 12 [see, for example, Patent Document 1 (JP-A-3-146122), Patent Document 2 (Japanese Patent No. 3213430) and Patent Document 3 (JP-A-62-273030)].

When palladium layer has been formed directly on a porous ceramic substrate, however, there is a problem that the affinity between the palladium and the porous ceramic substrate is not good. As a result, when the hydrogen separator obtained is exposed to a heat cycle, there may happen peeling of palladium from porous substrate or generation of other defects in palladium layer, and gas tightness of the palladium layer may reduce. Further, when, after the formation of palladium layer on a porous substrate, other metal, such as silver, is formed on the palladium and then heated to form a palladium alloy as a hydrogen-separating layer. There is a problem that the hydrogen-separating layer made of the alloy tends to peel from the porous substrate more easily, because of additional heating for alloying.

SUMMARY OF THE INVENTION

The present invention has bee made in view of the above-mentioned problems of prior art. The present invention aims at providing a hydrogen separator whose hydrogen-separating layer hardly generates defects such as peeling, cracks or the like and which is suitable for use even when the hydrogen separator is exposed to a heat cycle, used under high temperature conditions or/and used for long-term; and a process for producing such a hydrogen separator.

The present inventors made a study in order to achieve the above aim. As a result, it was found that the above aim is achievable by using, between the porous substrate and hydrogen-separating layer of hydrogen separator, an intermediate layer made of an electron-conductive ceramic having high affinity to both of the porous substrate and hydrogen-separating layer. The present invention has been completed based on the finding.

According to the present invention, there are provided a hydrogen separator and a process for production thereof, both described below.

[1] A hydrogen separator comprising:
a porous substrate composed mainly of a ceramic having a large number of pores connecting from one surface of the substrate to other surface, and a hydrogen-separating layer made of a hydrogen permselective metal formed on the porous substrate via an intermediate layer made of an electron-conductive ceramic.

[2] A hydrogen separator according to [1], wherein the electron-conductive ceramic is at least one member selected from the group consisting of titanium nitride (TiN), zirconium nitride (ZrN), indium-tin oxide ($In_2O_3.Sn$), zinc oxide (ZnO) and titanium oxide [$TiO_x (0<x<2)$].

[3] A hydrogen separator according to [1] or [2], wherein the ceramic for a porous substrate is at least one member selected from the group consisting of alumina, silica, silica-alumina, mullite, cordierite and zirconia.

[4] A hydrogen separator according to any of [1] to [3], wherein the hydrogen permselective metal is palladium (Pd) or an alloy containing palladium (Pd).

[5] A hydrogen separator according to any of [1] to [4], wherein the hydrogen-separating layer has a thickness between 1 and 5 μm.

[6] A hydrogen separator according to any of [1] to [5], wherein an anti-oxidant layer is formed on the intermediate layer in an inert atmosphere or under a vacuum condition and the hydrogen-separating layer is formed via the anti-oxidant layer.

[7] A hydrogen separator according to [6], wherein the anti-oxidant layer is a layer made of at least one metal selected from the group consisting of palladium (Pd), platinum (Pt), silver (Ag) and gold (Au).

[8] A process for producing a hydrogen separator comprising a porous substrate composed mainly of a ceramic having a large number of pores connecting from one surface of the substrate to other surface, and a hydrogen-separating layer made of a hydrogen permselective metal formed on the porous substrate, wherein an intermediate layer made of an electron-conductive ceramic is formed on the one surface of the porous substrate, and then the hydrogen-separating layer is formed on the surface of the intermediate layer.

[9] A process for producing a hydrogen separator according to [8], wherein the electron-conductive ceramic is at least one member selected from the group consisting of titanium nitride (TiN), zirconium nitride (ZrN), indium-tin oxide ($In_2O_3.Sn$), zinc oxide (ZnO) and titanium oxide [$TiO_x (0<x<2)$].

[10] A process for producing a hydrogen separator according to [8] or [9], wherein the ceramic for a porous substrate is at least one member selected from the group consisting of alumina, silica, silica-alumina, mullite, cordierite and zirconia.

[11] A process for producing a hydrogen separator according to any of [8] to [10], wherein the hydrogen permselective metal is palladium (Pd) or an alloy containing palladium (Pd).

[12] A process for producing a hydrogen separator according to any of [8] to [11], wherein the hydrogen-separating layer has a thickness between 1 and 5 μm.

[13] A process for producing a hydrogen separator according to any of [8] to [12], wherein an anti-oxidant layer is formed on the intermediate layer in an inert atmosphere or under a vacuum condition and the hydrogen-separating layer is formed via the anti-oxidant layer.

[14] A process for producing a hydrogen separator according to [13], wherein the anti-oxidant layer is a layer made of at least one metal selected from the group consisting of palladium (Pd), platinum (Pt), silver (Ag) and gold (Au).

The hydrogen separator of the present invention hardly generates defects such as peeling, cracks or the like in the hydrogen-separating layer and is suitable for use even when the hydrogen separator is exposed to a heat cycle, used under high-temperature conditions or/and used for long-term. According to the present process for producing a hydrogen separator, there can be easily produced a hydrogen separator which hardly generates defects such as peeling, cracks or the like in the hydrogen-separating layer and is suitable for use even when the hydrogen separator is exposed to a heat cycle, used under high-temperature conditions or/and used for long-term.

In these referential numerals, 1 and 11 are each a hydrogen separator; 2 and 12 are each a porous substrate; 3 and 13 are each a hydrogen-separating layer; 5 and 15 are each one surface of a porous substrate; and 10 is an intermediate layer.

BEST MODE FOR CARRYING OUT THE INVENTION

The best mode for carrying out the present invention is described below. However, the present invention is not restricted to the following embodiment and it should be understood that alterations, modifications and etc. can be appropriately added to the following embodiment based on the ordinary knowledge, as long as there is no deviation from the gist of the present invention.

Figure 1:
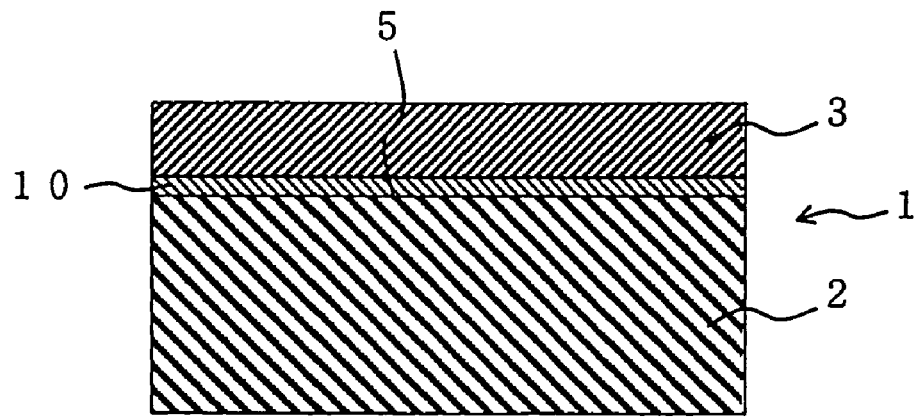
FIG. 1 is a sectional view schematically showing an embodiment of the hydrogen separator of the present invention.
Figure 2:
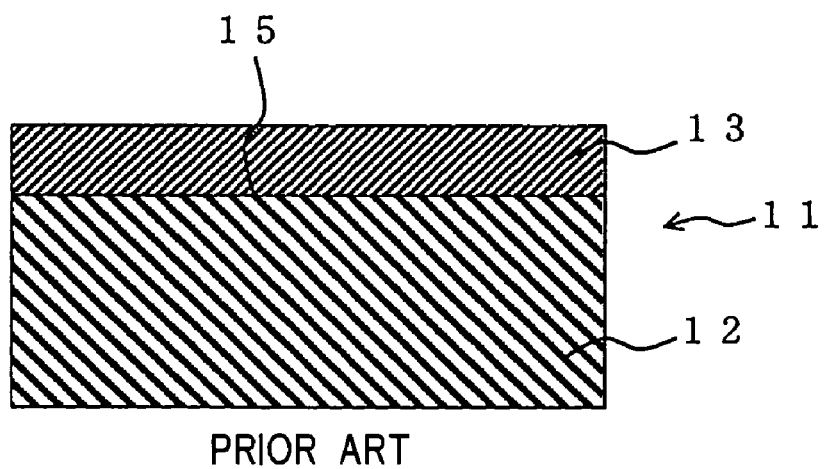
FIG. 2 is a sectional view schematically showing an embodiment of conventional separators.

FIG. 1 is a sectional view showing an embodiment of the hydrogen separator of the present invention. As shown in FIG. 1, the hydrogen separator 1 of this embodiment comprises a porous substrate 2 having a large number of pores connecting from one surface 5 of the porous substrate 2 to other surface (not shown) and a hydrogen-separating layer 3 formed on the porous substrate 2 via an intermediate layer 10. The porous substrate 2 is composed mainly of a ceramic. The hydrogen-separating layer 3 is made of a hydrogen permselective metal, and can selectively transmit only hydrogen from a hydrogen-containing gas (a to-be-treated gas) incoming from the one surface 5 or other surface side of the porous substrate and can exhaust the hydrogen from the other surface or one surface 5 side. Thus, when the hydrogen separator 1 is used for separation of hydrogen from to-be-treated gas, it is possible that the to-be-treated gas is taken in from the one surface 5 side and hydrogen is exhausted from the other surface side, or the to-be-treated gas is taken in from the other surface side and hydrogen is exhausted from the one surface 5 side.

In the hydrogen separator 1 of the present embodiment, the hydrogen-separating layer 3 is formed on the one surface 5 of the porous substrate 2 via an intermediate layer 10. This intermediate layer 10 is made of an electron-conductive ceramic and does not prevent the hydrogen flow from the other surface side or the one surface 5 side. As a specific example of the electron-conductive ceramic constituting the intermediate layer 10, there can be mentioned at least one member selected from the group consisting of titanium nitride (TiN), zirconium nitride (ZrN), indium-tin oxide ($In_2O_3 \cdot Sn$) (hereinafter, sometimes referred to also as "ITO"), zinc oxide (ZnO) and titanium oxide [$TiO_x(0<x<2)$]. The electron-conductive ceramic has electron conductivity and accordingly has good affinity with the hydrogen-separating layer 3 made of a metal (a metal component). Further, the electron-conductive ceramic is a kind of ceramic and accordingly has good affinity also with the porous substrate composed mainly of a ceramic. Thus, the hydrogen separator 1 of the present embodiment has a layer made of an electron-conductive ceramic, as the intermediate layer 10 between the hydrogen-separating layer 3 and the porous substrate 2. As a result, in the hydrogen separator 1, the affinity between the hydrogen-separating layer 3 and the porous substrate 2 is improved as compared with a case when the hydrogen-separating layer 3 and the porous substrate 2 are contacted in direct. Consequently, the hydrogen separator 1 of the present embodiment hardly generates defects such as peeling, cracks or the like in the hydrogen-separating layer 3 and is suitable for use even when the hydrogen separator 1 is exposed to a heat cycle, used under high temperature conditions or/and used for long-term.

The porous substrate 2 usable for the hydrogen separator 1 is composed mainly of a ceramic, which has heat resistance, corrosion resistance and high mechanical strengths. There is no particular restriction on the kind of the ceramic, and any ceramic ordinarily used in hydrogen separators can be employed. There can be mentioned, for example, at least one member selected from the group consisting of alumina, silica, silica-alumina, mullite, cordierite and zirconia. Incidentally, the porous substrate 2 may contain small amounts of components present inevitably and components added ordinarily. Furthermore, the porous substrate 2 may form any shape as far as it can be used as a substrate for hydrogen separator without causing any problem during the actual use as a hydrogen separator. For example, it may be a disc, plate, tube which may have one hole or more, or honeycomb structure.

The porous substrate 2 has a large number of pores connecting three-dimensionally. The diameters of the pores are between 0.003 and 2 μm preferably, and between 0.1 and 1 μm more preferably. When the pore diameters are less than 0.003 μm, a gas flow may be somewhat prevented. When the pore diameters are more than 2 μm, it is difficult to plug the pores of porous substrate with a hydrogen-separating layer 3, and gas tightness of hydrogen separator 1 may become worse.

The pores of the porous substrate 2 are preferred to be uniform in diameter. With the uniformity of pores in diameter, there can be avoided a reduction of gas tightness because the pores are not plugged with a hydrogen permselective metal in formation of a hydrogen-separating layer 3.

As the hydrogen permselective metal constituting the hydrogen-separating layer 3, there is no restriction as long as the metal allows for selective permeation of hydrogen. As such a metal, there is specifically preferred palladium (Pd) or an alloy containing palladium (Pd). Palladium is preferred because it allows for selective and effective permeation of hydrogen. As the alloy containing palladium (Pd), there are preferred an alloy between palladium (Pd) and silver (Ag) and an alloy between palladium (Pd) and copper (Cu). By alloying palladium (Pd) with silver (Ag) or copper (Cu), the embrittlement of palladium (Pd) by hydrogen is prevented and efficiency of hydrogen separation can be higher at high temperatures.

The thickness of the hydrogen-separating layer 3 is preferred to be between 1 and 5 μm. When the thickness of the hydrogen-separating layer 3 is less than 1 μm, the hydrogen-separating layer 3 may generate defects easily; when the thickness is more than 5 μm, efficiency of hydrogen separation in the hydrogen-separating layer 3 may reduce.

The thickness of the intermediate layer 10 is between 0.005 and 1 μm preferably, and between 0.01 and 0.5 μm more preferably. When the thickness of the intermediate layer 10 is less than 0.005 μm, the effect of increasing the affinity between the hydrogen-separating layer 3 and the porous substrate 2 may decrease; when the thickness is more than 1 μm, the pores of the porous substrate 2 may be plugged by the intermediate layer 10. Incidentally, it is preferred that the intermediate layer 10 covers one surface 5 of the porous substrate 2 so as not to plug the pores of the porous substrate 2. Thereby, there occurs easily the flow of hydrogen, which has permeated the hydrogen-separating layer 3, through the pores of the porous substrate 2 and the exhaust of hydrogen from other surface side of the porous substrate 2.

Figure 3:
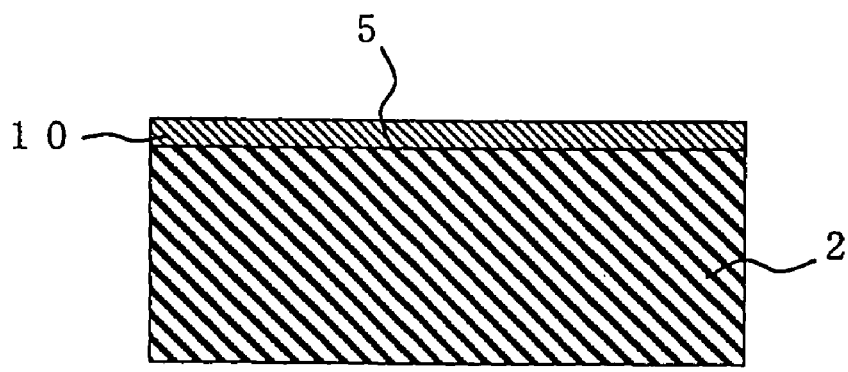
FIG. 3 is a sectional view schematically showing a state in which an intermediate layer has been formed on a porous substrate.

Next, an embodiment of the present process for producing a hydrogen separator is described with reference to FIGS. 1 and 3. FIG. 3 is a sectional view schematically showing a state in which an intermediate layer has been formed on a porous substrate. In this embodiment of the process for producing a hydrogen separator, first, an intermediate layer 10 made of an electron-conductive ceramic is formed on one surface 5 of a porous substrate 2 composed mainly of a ceramic, as shown in FIG. 3. Then, a hydrogen-separating layer made of a hydrogen permselective metal is formed by plating on the intermediate layer 10, whereby can be obtained a hydrogen separator 1 shown in FIG. 1.

As to the method for forming the intermediate layer 10 made of an electron-conductive ceramic on one surface 5 of the porous substrate 2, there is no particular restriction. However, it is preferred to form the intermediate layer 10 on one surface 5 of the porous substrate 2 by, for example, sputtering, chemical vapor deposition (CVD), ion plating or the like. With such means, the intermediate layer 10 can be uniformly formed on the whole part of one surface 5 in a desired thickness.

When there is a fear that the intermediate layer 10 is oxidized and deteriorated, it is desired that the intermediate layer 10 is formed on the porous substrate 2, then an anti-oxidant layer is formed on the intermediate layer 10, and the hydrogen-separating layer 3 is formed via the anti-oxidant layer. As the metal constituting the anti-oxidant layer, a noble metal which is resistant to oxidation is preferred. Specifically, there is preferred at least one metal selected from the group consisting of palladium (Pd), platinum (Pt), silver (Ag) and gold (Au).

In order to form the hydrogen-separating layer 3 on the intermediate layer 10 by plating, it is preferred to employ, for example, chemical plating. In forming palladium (Pd) on the intermediate layer 10 by chemical plating, first, in order to adhere an activating metal on the intermediate layer 10, the porous substrate 2 having an intermediate layer 10 formed on one surface 5 is dipped into a solution containing an activating metal, and washed with pure water. A divalent palladium compound can be preferably used as the activating metal. In order to make the activating metal adhere on the intermediate layer 10, in case palladium (Pd) is used as a hydrogen permselective metal, it is preferred to dip the porous substrate 2 into an aqueous hydrochloric acid solution of palladium chloride and an aqueous hydrochloric acid solution of tin chloride alternately.

After the activating metal has been adhered on the intermediate layer 10, the intermediate layer 10 side of the porous substrate 2 is dipped into a plating solution containing a hydrogen permeable metal, such as palladium (Pd), and a reducing agent. Thereby, palladium (Pd) is deposited with using the activating metal as a nucleus and a hydrogen-separating layer 3 made of palladium (Pd) is formed. As the reducing agent, there can be mentioned hydrazine, dimethylamine boran, sodium phosphinate and sodium phosphonate, or the like.

In order to form the hydrogen-separating layer 3 on the intermediate layer 10 by plating, it is also possible to adopt electroplating using the intermediate layer 10 or the anti-oxidant layer as an electrode.

When an alloy of palladium (Pd) and silver (Ag) is used as the hydrogen permselective metal constituting the hydrogen-separating layer 3, a layer made of palladium (Pd) is formed on the intermediate layer 10 by chemical plating; then, silver (Ag) is plated on the layer made of palladium (Pd). Thereafter, by heating of palladium (Pd) layer and silver (Ag) layer, an alloy of palladium (Pd) and silver (Ag), which is a hydrogen permselective metal for a hydrogen-separating layer 3, is formed by mutual diffusion. Incidentally, in plating silver (Ag) on the layer made of palladium (Pd), chemical plating or electroplating, in which the layer made of palladium (Pd) is used as an electrode, is preferred. In this case, the mass ratio (Pd:Ag) of palladium (Pd) and silver (Ag) used is between 90:10 and 70:30 preferably.

EXAMPLES

The present invention is described specifically below by way of Examples. However, the present invention is in no way restricted to these Examples.

Example 1

A disc-shaped α-alumina porous substrate, which has an outer diameter of 30 mm, a thickness of 3 mm and an average surface pore diameter of 0.2 μm, was prepared as a porous substrate. A 100 nm-thick intermediate layer made of titanium nitrate (TiN) and a 100 nm-thick anti-oxidant layer made of palladium (Pd) were formed on the α-alumina porous substrate by sputtering. The α-alumina porous substrate having an intermediate layer was washed with pure water and then subjected to an activation treatment. The activation treatment was carried out by dipping the α-alumina porous substrate in a solution containing divalent palladium (Pd) compound and then by a reducing treatment. The α-alumina porous substrate after the activation treatment was dipped into a solution containing a palladium (Pd) salt, a complexing agent and a reducing agent, to prepare palladium (Pd) layer on the intermediate layer by chemical plating. A hydrogen-separating layer made of palladium (Pd) with a thickness of 2 μm was formed and a hydrogen separator of Example 1 was obtained.

The hydrogen separator obtained was heat-treated in argon (Ar) gas at 700° C. for 1 hour (hereinafter, this heat-treatment is referred to as "700° C. heat-treatment"). A one-cycle heat-treatment operation consisting of (1) a temperature increase from room temperature to 500° C. in nitrogen ($N_2$) gas under a pressure of 100 kPa, (2) a heat-treatment in hydrogen ($H_2$) gas under a pressure of 100 kPa at 500° C. for 1 hour, and (3) a temperature decrease from 500° C. to room temperature in nitrogen ($N_2$) gas under a pressure of 100 kPa, was executed 50 times; that is, there was executed a 50-cycle heat-treatment (hereinafter, referred to as "500° C.-50 times heat-treatment").

Helium (He) gas leakage amount of the hydrogen-separating layer made of palladium (Pd) was measured before the 700° C. heat treatment, after the 700° C. heat-treatment, and after the 500° C.-50 times heat-treatment. The helium (He) gas leakage amount was measured by introducing a helium (He) gas into the hydrogen-separating layer side of the α-alumina porous substrate at a pressure of 800 kPa and measuring the amount of helium (He) gas leaking from other surface side of the α-alumina porous substrate. A change in helium (He) gas leakage amount is shown in Table 1.

Example 2

A hydrogen separator of Example 2 was obtained in the same manner as in Example 1 except that a 100 nm-thick intermediate layer made of zirconium nitride (ZrN) was used in place of titanium nitride (TiN) on an α-alumina porous substrate by sputtering. The hydrogen separator obtained was treated with the same heat-treatments as in Example 1 and measured for helium (He) gas leakage amount. A change in helium (He) gas leakage amount is shown in Table 1.

Example 3

A hydrogen separator of Example 3 was obtained in the same manner as in Example 1 except that a 100 nm-thick intermediate layer made of an indium-tin oxide (ITO) was used in place of titanium nitride (TiN) on an α-alumina porous substrate by sputtering and a hydrogen-separating layer was formed thereon directly without formation of antioxidant layer. The hydrogen separator obtained was treated with the same heat treatments as in Example 1 and measured for helium (He) gas leakage amount. A change in helium (He) gas leakage amount is shown in Table 1.

Comparative Example 1

A hydrogen separator of Comparative Example 1 was obtained in the same manner as in Example 1 except that a hydrogen-separating layer was formed directly on an α-alumina porous substrate and neither intermediate layer made of titanium nitride (TiN) nor anti-oxidant layer made of palladium (Pd) was formed on the α-alumina porous substrate. The hydrogen separator obtained was treated with the same heat treatments as in Example 1 and measured for helium (He) gas leakage amount. A change in helium (He) gas leakage amount is shown in Table 1.

TABLE 1

| | | Helium (He) gas leakage amount [ml/($cm^2$ · min)] | | |
|---|---|---|---|---|
| | Intermediate layer | Before 700° C. heat treatment | After 700° C. heat treatment | After 500° C.-50 times heat treatment |
| Example 1 | TiN | 0.0053 | 0.0055 | 0.0056 |
| Example 2 | ZrN | 0.0049 | 0.0056 | 0.0060 |
| Example 3 | ITO | 0.0061 | 0.0062 | 0.0063 |
| Comparative Example 1 | — | 0.0055 | 0.0881 | 0.2052 |

As is clear from Table 1, the hydrogen separators of Examples 1 to 3 are substantially low in a reduction of gas tightness after 700° C. heat-treatment or after 500° C.-50 times heat-treatment as compared with Comparative Example 1. Incidentally, the same effects as in Examples 1 to 3 were confirmed also when there was used, as an intermediate layer, zinc oxide (ZnO) or a titanium oxide [$TiO_x$ (0<x<2)].

INDUSTRIAL APPLICABILITY

The hydrogen separator of the present invention hardly generates defects such as cracks or the like in the hydrogen-separating layer, is suitable for use under high temperature conditions or/and for long-term use, and is useful as a separator for selectively separating only hydrogen from a hydrogen-containing gas such as steam-reformed gas or the like.

What is claimed is:

1. A hydrogen separator comprising:
   a porous substrate composed mainly of a ceramic having a large number of pores communicating from one surface of the substrate to other surface, and
   a hydrogen-separating layer made of a hydrogen permselective metal formed on the porous substrate, via an intermediate layer made of an electron-conductive ceramic which is zinc oxide,
   wherein the intermediate layer has a thickness between 0.01 μm and 0.5 μm, and the hydrogen-separating layer has a thickness between 1 μm to 5 μm,
   wherein the intermediate layer is directly bonded to the porous substrate so as not to fill the pores of the porous substrate.

2. A hydrogen separator according to claim 1, wherein the ceramic for a porous substrate is at least one member selected from the group consisting of alumina, silica, silica-alumina, mullite, cordierite and zirconia.

3. A hydrogen separator according to claim 1, wherein the hydrogen permselective metal is palladium (Pd) or an alloy containing palladium (Pd).

4. A hydrogen separator according to claim 1, wherein an anti-oxidant layer is formed on the intermediate layer in an inert atmosphere or under a vacuum condition and the hydrogen-separating layer is formed via the anti-oxidant layer.

5. A hydrogen separator according to claim 4, wherein the anti-oxidant layer is a layer made of at least one metal selected from the group consisting of palladium (Pd), platinum (Pt), silver (Ag) and gold (Au).

6. A hydrogen separator according to claim 1, wherein the pores in the porous substrate are between 0.003 μm and 2 μm.

7. A hydrogen gas separator according to claim 1, further comprising an anti-oxidant layer formed between the intermediate layer and the hydrogen-separating layer.

8. A hydrogen gas separator according to claim 1, wherein the hydrogen gas separator is heat treated in argon gas at a temperature of 700° C. for one hour and a helium gas leakage amount after heat treatment varies by no more than 0.0007 ml/$cm^2$min from a helium gas leakage amount before heat treatment.

9. A process for producing a hydrogen separator comprising:
   providing a porous substrate composed mainly of a ceramic having a large number of pores connecting from one surface of the substrate to other surface;
   forming an intermediate layer made of an electron-conductive ceramic, which is zinc oxide, on the one surface of the porous substrate, wherein the intermediate layer is directly bonded to the porous substrate so as not to fill the pores of the porous substrate;

forming a hydrogen-separating layer on the surface of the intermediate layer, wherein the hydrogen-separating layer is made of a hydrogen permselective metal;

wherein the intermediate layer has a thickness between 0.01 μm and 0.5 μm, and the hydrogen-separating layer has a thickness between 1 μm and 5 μm.

10. A process for producing a hydrogen separator according to claim 9, wherein the ceramic for a porous substrate is at least one member selected from the group consisting of alumina, silica, silica-alumina, mullite, cordierite and zirconia.

11. A process for producing a hydrogen separator according to claim 9, wherein the hydrogen permselective metal is palladium (Pd) or an alloy containing palladium (Pd).

12. A process for producing a hydrogen separator according to claim 9, wherein an anti-oxidant layer is further formed on the intermediate layer in an inert atmosphere or under a vacuum condition and the hydrogen-separating layer is formed via the anti-oxidant layer.

13. A process for producing a hydrogen separator according to claim 12, wherein the anti-oxidant layer is a layer made of at least one metal selected from the group consisting of palladium (Pd), platinum (Pt), silver (Ag) and gold (Au).

* * * * *